United States Patent Office 2,754,178
Patented July 10, 1956

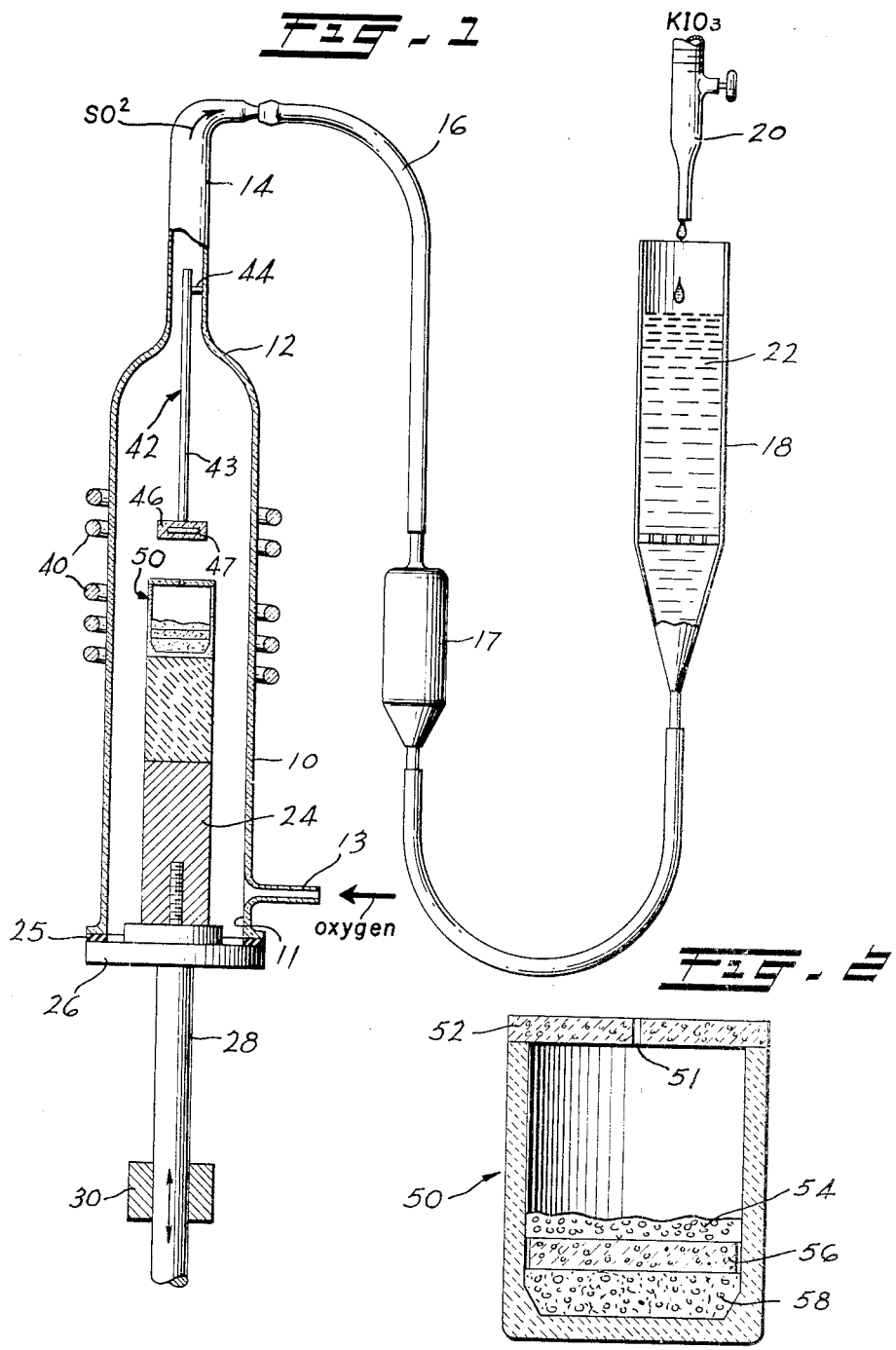

2,754,178

METHOD AND APPARATUS FOR OXIDIZING HYDROCARBONS

Stanley J. Mack, Chicago, Ill., assignor to Lindberg Engineering Company, Chicago, Ill., a corporation of Illinois Application December 6, 1954, Serial No. 473,230

7 Claims. (Cl. 23—230)

This invention relates to the quantitative analysis of hydrocarbons for determining sulfur, and more particularly, to an improved method and apparatus for oxidizing the hydrocarbon sample in a high-frequency induction furnace.

The method proposed heretofore for determination of sulfur, utilizing an induction furnace, consisted in dispensing a measured quantity of the sample of hydrocarbon into a crucible containing a quantity of electrically conductive material, placing the crucible in a combustion tube embraced by a high-frequency induction coil, flowing oxygen through the tube, and vaporizing the sample by inductively heating the conductive material. Upon vaporization, the sulfur in the sample is converted to sulfur dioxide in the presence of the oxygen. The sulfur dioxide is absorbed in a suitable liquid which is titrated by the standard ASTM Iodometric sulfur method (E30-47). In certain instances it has been found that this method produces low results, particularly in analyzing liquid hydrocarbons such as oils. It is suspected that because the induction heating volatilizes the sample so rapidly, some of the sulfur compounds are carried over into the sulfur dioxide absorbent in the combined rather than in the decomposed and oxidized state. If all of the sulfur is not converted to the oxide, the results, of course, will be low since the absorbent is capable of absorbing only sulfur in the oxide form.

A general object of this invention is to provide a rapid and accurate method for determining the sulfur content of hydrocarbons.

It is another object of this invention to provide a method and apparatus for volatilizing hydrocarbon samples in which substantially all of the sulfur is removed from the sulfur compounds in the sample by decomposition, and subsequently oxidized.

Another object is to provide a crucible construction and method of loading which insures complete decomposition and volatilization of the sample.

A further object is to provide a method and apparatus for decomposing a sample of hydrocarbon and oxidizing the sulfur thus produced, which method is not explosive.

These and other objects will appear from the following description and the appended claims which set out the invention in particularity.

In the drawings:

Figure 1 is a diagrammatic sectional view of the apparatus of the invention, and Figure 2 is an enlarged sectional view of the crucible prepared in accordance with the invention just prior to inserting in the combustion tube.

A combustion tube 10 having an opening 11 in the lower end serves to confine the crucible or cupelet 50 which holds the unknown hydrocarbon sample. The upper end 12 of the tube 10 terminates in a neck 14 to which a flexible tube 16 is connected for conducting the effluent combustion gases to the absorbing portion of the apparatus. A small tube 13 connects to the side wall of the tube 10 at its lower end for introducing oxygen. The tube 10 preferably is made from transparent quartz or a glass which contains a very high quantity of silica. For example, I have found that a glass containing 96% silica, sold under the trade name "Vycor," is very satisfactory. The temperature within the tube reaches 2500 to 3000° F. and, therefore, the material from which the tube is made must be highly refractory. The flexible tube 16 connects to a sulfur titration vessel 18, through a trap 17, to permit the effluent gases to bubble through the absorbent liquid 22 in the vessel. A burette 20 is mounted above the open end of the vessel 18 for adding measured quantities of titrating liquid.

A refractory cylinder or pedestal 24, mounted on an elevator platform 26, serves to support the crucible 50 within the combustion tube. The platform 26 is fixed to the end of a rod 28 which slides vertically within a bearing 30 fixed to a suitable support (not shown). Locking means (not shown) may be provided for holding the cylinder 28 in elevated position. A suitable seal 25 between the platform 26 and the lower edge of the tube 10 serves to seal the tube completely when the pedestal 24 is in elevated position.

To heat the sample, a high-frequency induction coil 40 embraces the upper portion of the combustion tube 10 and is adapted to induce current in conductive material placed in the crucible with the sample. The coil 40 is long enough to enclose a secondary heater 42 mounted just above the mouth of the crucible as well as the crucible itself. The heater 42 comprises a metal washer 47, preferably made from a ferrous metal, completely enclosed in a glass shell 46. A glass rod 43 is fused to the shell 46 at the lower end and attached to the side wall of the neck 14 by means of a stubby rod 44 near the upper end thereof. The ferrous metal may be replaced by any suitable conductive material that will attain a temperature of at least 2600° F. without vaporizing when placed within the high-frequency field.

The crucible 50 is of standard construction and is made from a refractory ceramic material, such as alumina or silica or a combination of the two. A bedding material 58 lies in the bottom of the crucible and serves as a repository for the liquid hydrocarbon. If the liquid hydrocarbon is poured directly into the crucible, it will permeate into the pores thereof and will be more difficult to volatilize. Alumina granules, for example, provide a surface to which the liquid sample adheres, and serve well as a bedding material. We have found that alumina granules of about 90 mesh, such as those sold under the name "Norton Alundum" are satisfactory for this purpose. Other suitable bedding materials include chemically pure chrome oxide, which, of course, must be sulfur-free and Whatman No. 1 filter paper. If the sample is a solid material, such as coal or rubber, the bedding material may be omitted.

A porous ceramic separator of slightly smaller diameter than the inside diameter of the crucible lies on top of the bedding material and serves to separate the sample from the conductive material 54. The separator may be made from porous alumina or silica which is sulfur-free, such as porous refractory brick. It must be able to withstand temperatures in excess of 2600° F. The conducting material 54 is preferably hydrogen-reduced iron, having a carbon content of less than .015% and a sulfur content of less than .008%. Such material is sold under the trade name "Plast-Iron" in the form of granules ranging from −6 to +20 mesh, which size is satisfactory for the purposes of this invention. Granulated tin of 30-mesh size is also satisfactory. A cover 52 for the cupelet encloses the materials placed therein but will permit escape of volatile gases which are evolved during the heating cycle. The cover 52 is a disc made from porous refractory ceramic material similar to the separator 56.

In operating the apparatus, approximately one gram of bedding material in the form of alumina granules (90 mesh) is placed in the bottom of the cupelet. A sample, containing an unknown amount of sulfur, and weighing from .05 to .07 gram is then poured over the alumina granules. Next, the separator 56 is put in place and exactly one gram of hydrogen-reduced iron is distributed over the surface of the separator. The crucible is then placed on the pedestal 24 of the combustion apparatus and elevated into the field of the induction coil 40 by raising the rod 28 within the bearing 30. Oxygen is introduced through the tube 13 near the bottom of the combustion tube at a rate of about 1500 milliliters per minute. The oxygen flows upwardly through the combustion tube, the flexible tube 16, and bubbles into the absorbent material 22 in the vessel 18. The absorbent may be a very dilute solution of hydrochloric acid containing starch as an indicator. Seventy-five milliliters of absorbent to one milliliter of starch has been found to be a satisfactory ratio. The high-frequency coil 40 is then energized, which causes the iron 54 in the crucible to attain a temperature of 2600° F. or over in a very short time, say less than one minute. The heat evolved from the eddy currents induced within the iron and the exothermic heat of reaction generated in converting the iron to iron oxide, radiate through the porous disc 56 and gradually volatilize the hydrocarbon sample adsorbed on the surface of the alumina granules 58. It is important that the heat be transferred to the sample through the porous disc in this manner. If the sample is placed in direct contact with the hydrogen-reduced iron or other conducting material it will volatilize before decomposition has been completed. Some of the sulfur compounds in oils will not decompose until a temperature of about 2600° F. is attained. If the sample is permitted to escape from the crucible before this temperature is attained, these sulfur compounds will pass through the apparatus without having been converted to sulfur dioxide, thus producing low results. The porous separator 56 provides sufficient impediment to the escaping gases so that the sample is heated above the temperature at which all of the sulfur compounds in the sample are decomposed. The sulfur, which has been loosed from the chemical compounds in which it was bound, passes out of the crucible through the porous disc 52. A small hole 51 in the cover 52 may be provided to further facilitate escape of the gases, if desired. The sulfur then comes into contact with the oxygen flowing through the tube and is immediately oxidized to sulfur dioxide.

To insure sufficient heat for immediate and complete combustion of the effluent gases, a secondary induction heater 42 is provided within the field of the high-frequency coil 40. This heater prevents explosions since no substantial amount of uncombusted gases are permitted to accumulate above the crucible. The secondary heater also serves to prevent condensation of the effluent gases on the wall of the combustion tube 10. It is desired, of course, to sweep the gases through the tube into the titrating vessel without permitting deposition on the walls of the tubes. If it is necessary to revolatilize condensed vapors, there is always a possibility that some of the sulfur will remain behind.

Sulfur dioxide in the effluent gases is absorbed in the dilute hydrochloric acid solution and standard potassium iodate is used to titrate the solution. From the amount of standard potassium iodate used to reach the end point, the sulfur content may be calculated.

A correction must be made for the amount of sulfur in the hydrogen-reduced iron or other conducting material. This amount is usually very small as compared with the total amount of sulfur being determined. As indicated, commercially available hydrogen-reduced iron contains only .008% sulfur.

One of the important advantages accruing from the present invention is the short time required to complete the analysis. It takes only three or four minutes from the time the switch to the coil is snapped on until the sample is completely titrated and all of the sulfur dioxide has been evolved. More important is the fact that the sulfur determination is very accurate. This is because all of the sulfur compounds in the sample are converted to sulfur dioxide, the only form in which the sulfur may be absorbed. The following table illustrates the results obtained in analyzing various oil samples; the first column sets forth the results (each figure an average of 100 samples) obtained by following the process of the present invention, and the second column indicates the results obtained on duplicate samples by following standard gravimetric procedure:

| Sample | I | II |
|---|---|---|
| | Percent | Percent |
| A | .505 | .48– .53 |
| B | .996 | .98–1.03 |
| C | 1.65 | 1.62–1.69 |
| D | .63 | .59– .64 |
| E | .035 | .03– .045 |

The method of analysis used in making the determinations in Column I followed the procedure of ASTM E30–47T, with the exception of the method and apparatus employed in the combustion of the sample. The average deviation found in the method was plus or minus 0.02% for sulfur contents ranging from .5% to 1.5%. For sulfur contents above 1.5%, the deviation was plus or minus .03%, and for sulfurs under .5% the deviation was .005%.

The example set forth above is for the purpose of illustrating the invention and is not intended as a limitation. Obviously, substitute materials and other variations will occur to those skilled in the art without departing from the spirit of the invention.

What I claim is:

1. A method for oxidizing a liquid hydrocarbon sample comprising the steps of pouring a measured quantity of the sample over a bedding material in the bottom of a crucible, placing a unitary thermal-insulating porous ceramic separator over the sample, laying a conductive material on the separator, covering the crucible with a porous ceramic cover, enclosing the crucible in a combustion tube, and inductively heating the conductive material to volatilize the sample while passing oxygen through the tube.

2. The method of claim 1 in which the conductive material is hydrogen-reduced iron containing a known minute quantity of sulfur.

3. The method of claim 1 in which the bedding material consists of alumina granules.

4. The method of claim 1 in which the conductive material is hydrogen-reduced iron containing a known minute quantity of sulfur and the porous ceramic cover and separator are made from alumina.

5. A method for oxidizing a liquid hydrocarbon sample comprising the steps of pouring a measured quantity of the sample over a bedding material in the bottom of a crucible, placing a unitary thermal-insulating porous ceramic separator over the sample, laying a conductive material on the separator, covering the crucible with a porous ceramic cover, enclosing the crucible in a combustion tube, inductively heating the conductive material to volatilize the sample while passing oxygen through the tube, and providing a concentrated source of heat within the tube above the crucible to insure complete oxidation of the volatilized material escaping from the crucible.

6. In an apparatus for oxidizing a liquid hydrocarbon sample, a crucible for holding the sample, a unitary thermal-insulating porous ceramic separator mounted within the crucible above the sample, granular conductive material lying on said porous separator, a porous ceramic cover for said crucible, a combustion tube enclosing said crucible, a secondary heater comprising conductive material enclosed in a refractory ceramic shell mounted within the combustion tube above the crucible, and a high frequency coil embracing the portion of the tube surrounding the crucible and the secondary heater.

7. The apparatus of claim 6 in which the refractory ceramic shell of said secondary heater consists essentially of silicia.

References Cited in the file of this patent

UNITED STATES PATENTS

| | | |
|---|---|---|
| 1,515,237 | Yensen | Nov. 11, 1924 |
| 1,795,926 | Brace | Mar. 10, 1931 |
| 1,823,874 | Brace | Sept. 22, 1931 |
| 1,851,984 | Rennerfelt | Apr. 5, 1932 |
| 1,939,623 | Clamer | Dec. 12, 1933 |
| 2,039,165 | Hayakawa | Apr. 28, 1936 |
| 2,103,623 | Kott | Dec. 28, 1937 |
| 2,266,002 | Clark | Dec. 16, 1941 |
| 2,332,943 | Sobers | Oct. 26, 1943 |
| 2,382,301 | Dreher | Aug. 14, 1945 |
| 2,402,582 | Scaff | June 25, 1946 |
| 2,421,467 | Scribner | June 3, 1947 |
| 2,491,210 | Rennie | Dec. 13, 1949 |
| 2,610,107 | Dreher | Sept. 9, 1952 |
| 2,638,426 | Brace | May 12, 1953 |
| 2,669,504 | Halvorson et al. | Feb. 16, 1954 |
| 2,673,228 | Kistler | Mar. 23, 1954 |

OTHER REFERENCES

Holler: Analytical Chemistry, vol. 23, No. 10, pages 1696, 1697 (Oct. 1951).